United States Patent
Pabois

[11] Patent Number: 6,164,905
[45] Date of Patent: Dec. 26, 2000

[54] FLOW METERING TURBINE

[76] Inventor: Didier Pabois, 7, rue de L'Orge, F-91530 Saint Cheron, France

[21] Appl. No.: 09/242,542
[22] PCT Filed: Aug. 19, 1997
[86] PCT No.: PCT/FR97/01498
  § 371 Date: Aug. 31, 1999
  § 102(e) Date: Aug. 31, 1999
[87] PCT Pub. No.: WO98/08064
  PCT Pub. Date: Feb. 26, 1998

[30] Foreign Application Priority Data

Aug. 21, 1996 [FR] France .................................. 96 10339

[51] Int. Cl.⁷ .............................. F01D 25/16; F04D 29/04
[52] U.S. Cl. ........................ 415/142; 415/104; 415/112; 415/118; 415/169.1
[58] Field of Search .................................. 415/142, 229, 415/104, 121.2, 111, 112, 169.1, 176, 118

[56] References Cited

FOREIGN PATENT DOCUMENTS

| 0 147 004 | 7/1985 | European Pat. Off. . |
| 2 588 376 | 4/1987 | France . |
| 29 06 325 | 8/1980 | Germany . |
| 39 06 432 | 9/1990 | Germany . |
| WO 92/21939 | 12/1992 | WIPO . |

*Primary Examiner*—Edward K. Look
*Assistant Examiner*—Rhonda Barton
*Attorney, Agent, or Firm*—Seidel, Gonda, Lavorgna & Monaco, PC

[57] ABSTRACT

A flow metering turbine comprises a tubular body through which flows the fluid to be measured. The tubular body houses an upstream spider and a downstream spider each formed by a hub and fixed vanes, bearing the hub in the tubular body. The mutually facing ends of the hubs have a cavity on the axis of the tubular body for receiving a support bearing and thrust bearing. A screw member formed by a hub bearing vanes and a shaft is located between the spiders, the ends of the shaft being located in the support bearings of the spiders and against the thrust bearings. At least one fluid duct runs through each spider, opening into the cavity in line with the support bearing and thrust bearing.

3 Claims, 2 Drawing Sheets

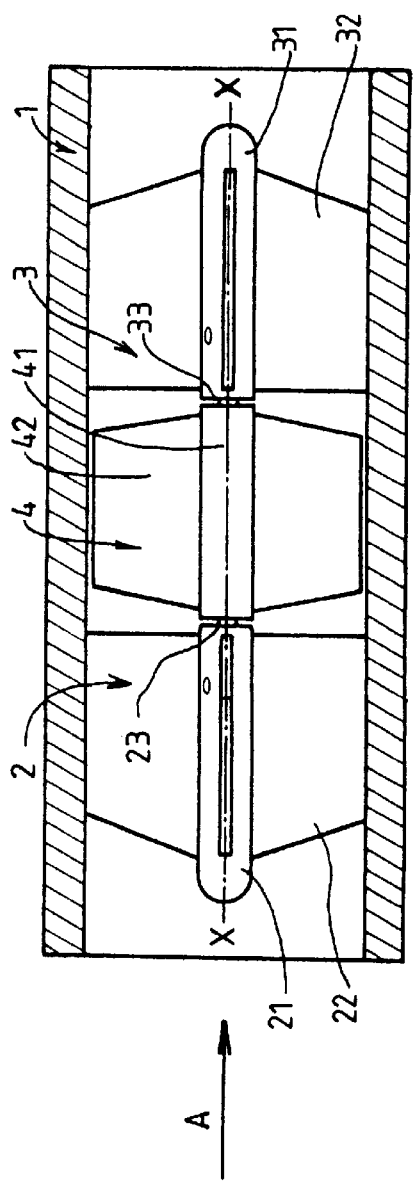
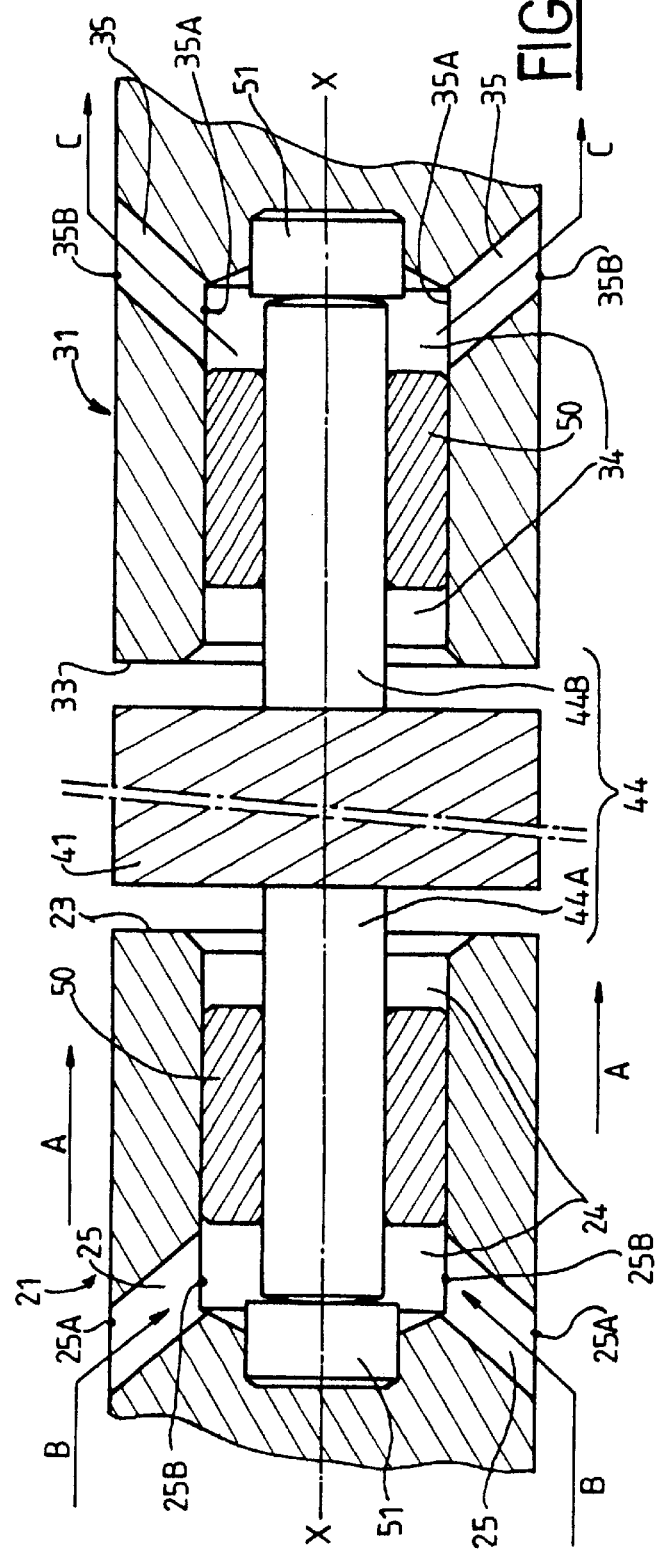

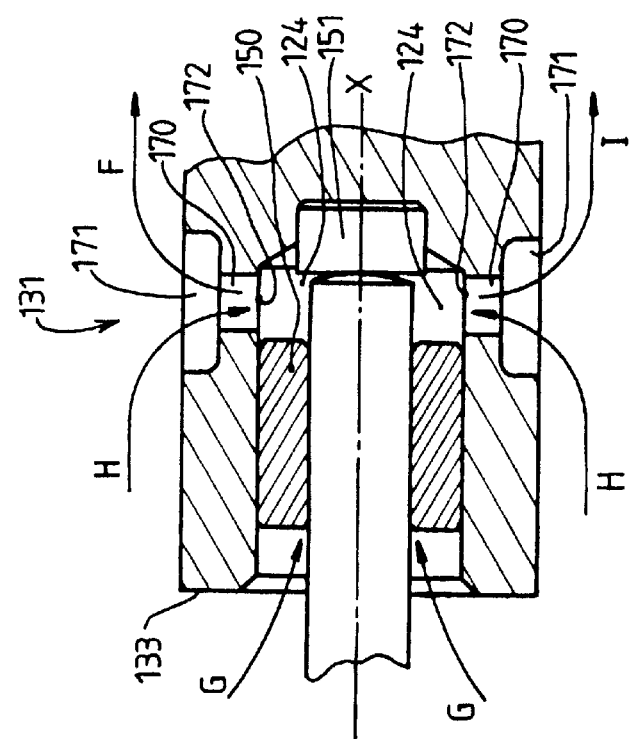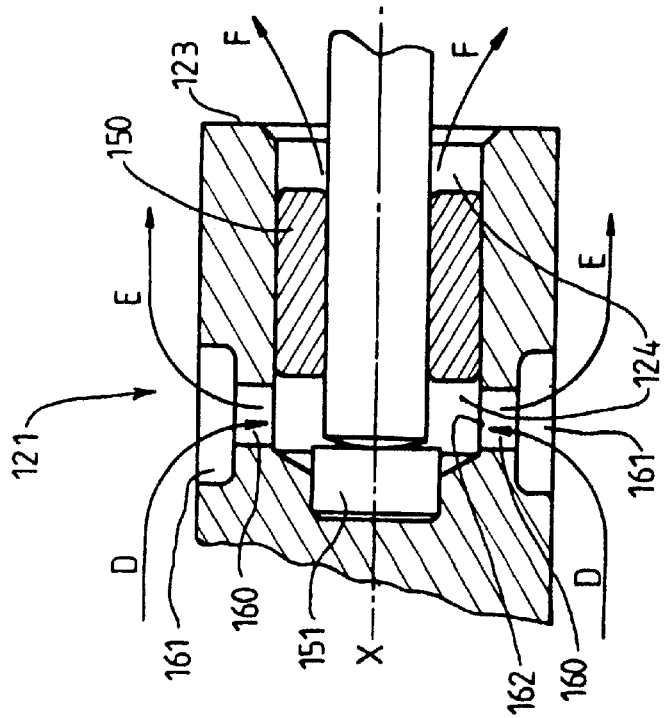
FIG.3

FLOW METERING TURBINE

The present invention concerns a flowmeter turbine comprising a tubular body through which the fluid to be measured passes and accommodating:

an upstream spider member and a downstream spider member which are each formed by a hub and fixed vanes supporting the hub in the tubular body, the opposite faces of the hubs having a cavity on the axis of the tubular body to receive a support bearing/thrust bearing assembly, and a screw member formed by a hub carrying vanes and an axis member, and disposed between the spider members, the ends of the axis member being accommodated in the support bearings of the spider members against the thrust bearings.

Flowmeter turbines are items of equipment which are highly sensitive to pollution of the fluid that they are measuring. Now, solid or highly viscous particles necessarily accumulate in the housings of the support bearing/thrust bearing assemblies: that increases the friction of such assemblies and causes a deterioration in the level of precision of the measurements afforded by the turbine.

In addition such particles reduce the operating life of the turbine.

The object of the present invention is to remedy those disadvantages and the invention proposes the provision of a flowmeter turbine which is insensitive to solid or viscous particles and indeed highly viscous particles, which are carried by the liquid to be measured.

For that purpose the invention concerns a flowmeter turbine of the above-defined type, characterised in that each spider member hub is traversed by at least one fluid duct opening into the cavity in line with the support bearing/thrust bearing assembly.

The circulation of the fluid which penetrates into the cavity, passes around the pivoting system formed by the axis member, the support bearing and the thrust bearing and makes it possible to rinse that cavity in order to remove the solid or viscous particles therefrom. That also makes it possible to prevent accumulated particles from agglomerating therein.

The invention reduces the coefficient of friction of the assembly, enabling the flowmeter turbine to retain its initial precision and sensitivity, making the turbine highly insensitive to pollution in the liquid: that makes it possible to measure liquids which are possibly more highly charged with particles than those measured at the current time, and to increase the service life of the turbine without necessitating frequent dismantling or replacement thereof.

In accordance with other advantageous features of the invention the spider member hub comprises a plurality of fluid ducts rich are regularly distributed at the periphery of the hub;

the ducts can be inclines with respect to the axis of the turbine, the intakes of the ducts in the upstream spider member being disposed upstream of the support bearing/thrust bearing assembly and the outlets of the ducts of the downstream spider member being disposed downstream of the support bearing/thrust bearing assembly:

the ducts can be produced from an external groove provided on the outside of the spider member hub.

The present invention will be described in greater detail hereinafter with reference to the accompanying drawings in which:

FIG. 1 is an overall view of a flowmeter turbine according to the invention with the tubular body cut away, FIG. 2 is a section view an enlarged scale of the upstream and downstream pivoting assemblies of the turbine shown in FIG. 1, and FIG. 3 is a section view similar to that shown in FIG. 2 illustrating an alternative embodiment.

Referring to FIG. 1 the flowmeter turbine is closed of a tubular boy 1 receiving an upstream spider member 2 and a downstream spider member 3 between which is disposed a measuring helix or screw member 4. The direction of flow of the fluid in the flowmeter turbine is represented by the arrow A.

The upstream spider member 2 and the downstream spider member 3 are of the same shape and structure. Each is composed of a hub 21, 31 provided with vanes 22, 32 which carry the hub 31 in the tubular body 1. There are for example four such vanes 22, 32.

The screw member 4 is mounted between the two spider members 2, 3. The screw member 4 is also composed of a hub 41 and vanes 42.

The screw member 4 is mounted in support bearings provided in the mutually facing ends 23, 33 of the hubs 21, 31 of the upstream and downstream spider members 2, 3.

The connecting portion between the upstream spider member 2 and the corresponding end of the screw member 4 will be the subject of the following description.

The pivoting assemblies of the upstream and downstream spider members are illustrated in the view on an enlarged scale in FIG. 2.

The screw member 4 which is shown only in part by virtue of its sectioned hub 41 is carried by a shaft or axis member, the ends 44A, 44B of which are accommodated in the pivoting assemblies of the hubs 21, 31.

Those pivoting assemblies are identical in shape but their assembly position is reversed.

The pivoting assembly of the upstream hub 21 is formed by a support bearing 50 and a thrust bearing 51 which are both accommodated in a cavity 24 provided in the face 23 of the hub. The end 44 or the axis member of the screw member 4 is accommodated in the bearing 50 and comes to bear against the thrust bearing 51.

In line with that pivoting assembly 51, 51, 44A the hub 21 is provided with ducts 25 which are inclined with respect to the axis X—X of the assembly and which open into the cavity 24 in line with the support bearing 50 and the thrust bearing 51. The ducts 25 permit fluid to flow as is indicated by the arrows 8, the general circulation of the fluid being indicated as previously by the arrows A The fluid which passes into the cavity 24 passes through the support bearing 50 and escapes therefrom by way of the face 23 and/or by another duct, entraining the solid or viscous particles.

The configuration of the pivoting assembly of the end 44B in the downstream hub 31 is symmetrical with respect to that described hereinbefore. The hub 31 also comprises a cavity 34 receiving a support bearing 50 and a thrust bearing 51. The hub 31 is provided with openings 35 which open in line With the pivoting assembly 50, 51, 448. In this case the fluid which enters by way of the upstream face 33 of the hub 31 passes through the support bearing 50 and flows in the cavity 34 around the support bearing 50, the thrust bearing 51 and the axis member end 448 to entrain any particles issuing therefrom by way of the duct or ducts 35 in the diction of the arrows C.

The ducts 35 are inclined with respect to the axis X—X, like the ducts 25 in the hub 21 of the upstream spider member F.

Thus, the intake 25A of the ducts 25 in the upstream spider member 2 is disposed upstream of their outlet 259 opening into the cavity 24 in the direction of flow if the fluid A, B, that is to say upstream of the assembly 50, 51 of the upstream spider member 2.

Likewise, the outlet 35B of the ducts 35 of the downstream spider member 3, starting from the orifice 35A thereof in the cavity 34, open to the exterior of the hub 31 of the spider member 34 at a downstream position at 35B in the direction of flow A, C of the fluid, that is to say downstream of the assembly 50, 51 of the downstream spider member 3.

In fact, the spider members 2, 3 and their component elements are identical in this embodiment and only the arrangement thereof in the tube 1 is reversed, FIG. 3 shows an alternative embodiment similar to that shown in FIG. 2, identical or similar elements being denoted by the same references but increased by 100, and the description thereof will not be repeated.

The upstream pivoting assembly 121 is provided with ducts 160 which start from an external groove 161 to open by way of the end 162 into the cavity 1Z4 in line with the support bearing 150 and the thrust bearing 151. The ducts 160 are substantially perpendicular to the axis X—X of the turbine.

The fluid flows as indicated by the arrows D, E, F: it passes into the groove 161 (arrows D) to pass through the duct 160 and arrive in the cavity 124. A part of the fluid issues from the cavity 124 again by way of the reverse path (arrows P) and the other part escapes through the support bearing by way of the face 123 (arrows F).

The groove 161 makes it possible to generate a turbulent flow at the duct end in order to improve circulation of the particles.

The downstream pivoting assembly 131 is identical to that upstream assembly 121; in a symmetrical position it also comprises straight dues 170 which are perpendicular to the axis X—X of the turbine, starting from a peripheral groove 171 and arriving by way of the mouth opening 172 in the cavity 124 in line with the support bearing 150 and the thrust bearing 151. The fluid passes into the cavity 124, either through the support bearing 150 (arrows G) or from the groove 171 (arrows H) to leave the cavity again by way of the ducts 170 and the groove 171 in this case there is also a turbulent flow Which promotes evacuation of the particles from the cavity 124.

The circulation of the fluid through the ducts 25, 35. 160 and 170 ensures, by virtue of an entrainment effect, continual cleaning of the operational surfaces of the upstream and downstream pivoting assemblies.

The number of ducts 25, 35. 160, 170 is selected in dependence on the dimension of the support bearings. Those ducts are preferably distributed regularly around the support bearings.

What is claimed is:

1. A flowmeter turbine comprising a tubular body through which a fluid to be measured passes, said tubular body accommodating:

an upstream spider member and a downstream spider member each formed by a hub and fixed vanes supporting the hub in the tubular body;

opposite faces of the spider member hubs having a cavity on the longitudinal axis of the tubular body to receive an assembly comprising a support bearing and thrust bearing;

a screw member formed by a screw member hub carrying vanes and an axis member and placed between the spider members, the ends of the axis member being accommodated in the support bearings of the spider members against the thrust bearings; and each spider member hub being traversed by at least one fluid duct opening into the cavity in line with the bearing assembly;

wherein the ducts are inclined with respect to the axis of the turbine, the intake of the at least one duct of the upstream spider member being disposed upstream of the bearing assembly and the outlet of the at least one duct of the downstream spider member being disposed downstream of the bearing assembly.

2. A flowmeter turbine according to claim 1, wherein the ducts start from peripheral grooves provided in the spider member hubs.

3. A flowmeter turbine according to claim 1, wherein each spider member hub comprises a plurality of fluid ducts which are distributed regularly at the periphery of the hub.

* * * * *